(12) United States Patent
Mori et al.

(10) Patent No.: US 8,144,282 B2
(45) Date of Patent: Mar. 27, 2012

(54) LIQUID CRYSTAL DISPLAY DEVICE HAVING FIRST AND SECOND PIXEL ELECTRODES OVERLAPPING A COMMON ELECTRODE AND CONNECTED TO FIRST AND SECOND SWITCHING ELEMENTS RESPECTIVELY

(75) Inventors: Ikuko Mori, Chiba (JP); Kikuo Ono, Mobara (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 112 days.

(21) Appl. No.: 12/591,403

(22) Filed: Nov. 18, 2009

(65) Prior Publication Data

US 2010/0066935 A1    Mar. 18, 2010

Related U.S. Application Data

(63) Continuation of application No. 12/232,156, filed on Sep. 11, 2008, now Pat. No. 7,643,102, which is a continuation of application No. 11/213,923, filed on Aug. 30, 2005, now Pat. No. 7,486,363.

(30) Foreign Application Priority Data

Sep. 22, 2004   (JP) ................................ 2004-274993

(51) Int. Cl.
 G02F 1/136    (2006.01)
 G02F 1/1343   (2006.01)

(52) U.S. Cl. .............................. 349/48; 349/39; 349/141

(58) Field of Classification Search .................... 349/48, 349/39, 141
See application file for complete search history.

(56) References Cited

U.S. PATENT DOCUMENTS

| 5,229,644 A | * | 7/1993 | Wakai et al. .................. 257/749 |
| 5,337,173 A | | 8/1994 | Atsumi et al. |
| 5,656,824 A | * | 8/1997 | den Boer et al. ................ 257/59 |
| 5,760,857 A | | 6/1998 | Yanagawa et al. |

(Continued)

FOREIGN PATENT DOCUMENTS

CN    1503042 A    11/2003

OTHER PUBLICATIONS

Office Action from Chinese Patent Office dated Feb. 5, 2010, in Chinese.

*Primary Examiner* — Mark Robinson
*Assistant Examiner* — Paisley L Arendt
(74) *Attorney, Agent, or Firm* — Stites & Harbison, PLLC; Juan Carlos A. Marquez, Esq

(57) ABSTRACT

The present invention provides a liquid crystal display device which includes a pixel electrode and a counter electrode in a pixel formed on a surface of a substrate which faces liquid crystal, the counter electrode is formed below an insulation film, and the pixel electrode is formed above the insulation film, wherein the counter electrode is formed over a whole area of a center except for a slight periphery of at least the pixel, the pixel electrode is constituted of separate pixel electrodes to which a video signal which is supplied to the pixel is inputted through the separate switching elements at the same timing, and the separate pixel electrodes are respectively formed of a plurality of electrodes and the respective electrodes are alternately arranged.

1 Claim, 8 Drawing Sheets

U.S. PATENT DOCUMENTS

| | | | |
|---|---|---|---|
| 5,808,706 A * | 9/1998 | Bae | 349/38 |
| 6,441,401 B1 * | 8/2002 | Jung et al. | 257/72 |
| 6,483,566 B2 | 11/2002 | Youn et al. | |
| 6,636,289 B2 | 10/2003 | Yoo et al. | |
| 6,741,311 B1 | 5/2004 | Hong et al. | |
| 6,940,573 B2 * | 9/2005 | Um et al. | 349/129 |
| 7,113,242 B2 * | 9/2006 | Kim et al. | 349/139 |
| 7,138,655 B2 * | 11/2006 | Tak et al. | 257/59 |
| 7,158,201 B2 * | 1/2007 | Kim et al. | 349/129 |
| 7,256,853 B2 | 8/2007 | Ono et al. | |
| 7,432,995 B2 | 10/2008 | Lee et al. | |
| 2001/0011981 A1 * | 8/2001 | Yamamoto et al. | 345/87 |
| 2001/0015783 A1 | 8/2001 | Ohta et al. | |
| 2001/0048500 A1 | 12/2001 | Lim et al. | |
| 2002/0018166 A1 | 2/2002 | Matsumoto et al. | |
| 2002/0176030 A1 | 11/2002 | Matsumoto | |
| 2003/0002002 A1 * | 1/2003 | Kawachi et al. | 349/143 |
| 2004/0263744 A1 * | 12/2004 | Lee et al. | 349/139 |
| 2005/0036091 A1 * | 2/2005 | Song | 349/129 |

* cited by examiner

LIQUID CRYSTAL DISPLAY DEVICE HAVING FIRST AND SECOND PIXEL ELECTRODES OVERLAPPING A COMMON ELECTRODE AND CONNECTED TO FIRST AND SECOND SWITCHING ELEMENTS RESPECTIVELY

CROSS REFERENCE TO RELATED APPLICATIONS

This application is a Continuation of U.S. patent application Ser. No. 12/232,156 filed Sep. 11, 2008 now U.S. Pat. No. 7,643,102, which is a Continuation of U.S. patent application Ser. No. 11/213,923 filed Aug. 30, 2005 now U.S. Pat. No. 7,486,363. Priority is claimed based upon U.S. patent application Ser. No. 12/232,156 filed Sep. 11, 2008, which claims priority to U.S. application Ser. No. 11/213,923 filed on Aug. 30, 2005, which claims the priority date of Japanese Application No. 2004-274993 filed on Sep. 22, 2004, and which is hereby incorporated by reference.

BACKGROUND OF THE INVENTION

1. Field of the Invention

The present invention relates to a liquid crystal display device, and more particularly to a liquid crystal display device which forms pixel electrodes and counter electrodes on a liquid crystal surface side of one substrate out of respective substrates which are arranged to face each other with liquid crystal therebetween.

2. Description of the Related Art

This type of liquid crystal display device is configured to control a quantity of light which passes through a region defined between pixel electrodes and counter electrodes by driving liquid crystal to which an electric field generated between respective electrodes is applied.

Such a liquid crystal display device has been known as a display device which exhibits excellent property in a so-called wide viewing angle, wherein the display is not changed even when viewed from the oblique direction with respect to a display surface.

Heretofore, the pixel electrodes and the counter electrodes are formed of a conductive layer which prevents light from passing through these electrodes.

However, recently, there has been known a liquid crystal display device having the constitution in which counter electrodes formed of a transparent electrode are formed over the whole area of a pixel region except for a periphery of the pixel region, and strip-like or comb-teeth-shaped pixel electrodes are arranged over the counter electrodes by way of an insulation film in a state that the transparent electrodes extend in one direction and are arranged in parallel in the direction which intersects one direction.

The liquid crystal display device having such a constitution generates an electric field which is substantially parallel to substrates between the pixel electrode and the counter electrode and hence, the liquid crystal display device can largely enhance a so-called numerical aperture while still ensuring the excellent wide viewing angle property.

Further, in such a constitution, when short-circuiting arises between the pixel electrode and the counter electrode which is arranged below the pixel electrode by way of an insulation film through a pin hole, a so-called point defect arises. As a liquid crystal display device which can overcome such a point defect, there has been known a liquid crystal display device disclosed in Japanese Patent Laid Open 2005-148534 which is a patent application filed prior to this application filed by the same applicant. Family of this application is co-pending in the U.S. as application Ser. No. 10/977,934.

In this literature, there is disclosed the constitution in which two pixel electrodes which are physically separated from each other are formed on the pixel region, and a video signal is supplied to these respective pixel electrodes through two respective thin film transistors which are turned on simultaneously in response to a scanning signal from a gate signal line.

Such a liquid crystal display device obtains an advantageous effect that even when one pixel electrode is short-circuited with the counter electrode, another pixel electrode still performs a function thereof and hence, a point defect does not occur.

SUMMARY OF THE INVENTION

However, the liquid crystal display device having such a constitution is configured such that the respective pixel electrodes are formed in respective regions which are defined by dividing the pixel with an imaginary line segment which passes the center of the pixel.

Accordingly, the liquid crystal display device is obliged to abandon a display in one region where the short-circuited pixel electrode is formed and hence, the brightness in the pixel inevitably is halved.

The present invention has been made under such circumstances and it is one advantage of the present invention to provide a liquid crystal display device which can prevent the brightness in a pixel from being halved even when short-circuiting arises between a pixel electrode and a counter electrode.

To briefly explain the summary of typical inventions among the inventions disclosed in this specification, they are as follows.

(1)

A liquid crystal display device according to the present invention includes, for example, a pixel electrode and a counter electrode in a pixel formed on a surface of a substrate which faces liquid crystal, the counter electrode is formed below an insulation film, and the pixel electrode is formed above the insulation film, wherein the pixel electrode is constituted of separate pixel electrodes which are formed on the counter electrode in an overlapped manner to which a video signal which is supplied to the pixel is inputted to the separate pixel electrodes through separate switching elements at the same timing, and the separate pixel electrodes are respectively formed of a plurality of electrodes and the respective electrodes are alternately arranged.

(2)

A liquid crystal display device according to the present invention is, for example, on the premise of the constitution (1), characterized in that the separate switching elements are turned on in response to a signal from a common gate signal line.

(3)

A liquid crystal display device according to the present invention is, for example, on the premise of the constitution (1), characterized in that one pixel electrode out of the separate pixel electrode has a comb-teeth-shaped pattern in which a conductive body to which respective electrodes are commonly connected is arranged close to one of drain signal lines which are arranged to sandwich the pixels, and another pixel electrode out of the separate pixel electrode has a comb-teethshaped pattern in which a conductive body to which respective electrodes are commonly connected is arranged close to another drain signal line.

(4)

A liquid crystal display device according to the present invention is, for example, on the premise of the constitution (1), characterized in that the counter electrode of each pixel is electrically connected with the counter electrode of another pixel which is arranged close to each pixel with a gate signal line arranged therebetween through a conducive layer which is formed on an insulation film which is formed in a state that the insulation film also covers the gate signal line.

(5)

A liquid crystal display device according to the present invention includes, for example, two neighboring thin film transistors in each pixel, wherein semiconductor layers of the respective thin film transistors are formed in common, on upper surfaces of the semiconductor layers, respective drain electrodes of the respective thin film transistors are formed in a strip shape, are curved and are formed in an semicircular shape having a center thereof on distal ends of source electrodes which constitute pairs with the drain electrodes, and the drain electrode of one thin film transistor is physically commonly connected with the drain electrode of another thin film transistor at a position where the drain electrodes are arranged close to each other, and a width of a commonly connected portion is equal to a width of portions other than the commonly connected portion.

(6)

A liquid crystal display device according to the present invention includes, for example, a pixel electrode and a counter electrode in a pixel formed on a surface of a substrate which faces liquid crystal, the counter electrode is formed below an insulation film, and the pixel electrode is formed above the insulation film, wherein the counter electrode is formed over a whole area of a center except for a slight periphery of at least the pixel, the pixel electrode is constituted of separate pixel electrodes to which a video signal which is supplied to the pixel is inputted through separate thin film transistors at the same timing, the separate pixel electrodes are respectively formed of a plurality of electrodes and the electrodes are alternately arranged, and the separate thin film transistors have semiconductor layers in common, on upper surfaces of the semiconductor layers, respective drain electrodes of the respective thin film transistors are formed in a strip shape, are curved and are formed in an semicircular shape having a center thereof on distal end portions of source electrodes which constitute pairs with the drain electrodes, the drain electrode of one thin film transistor is physically commonly connected with the drain electrode of another thin film transistor at a position where the drain electrodes are arranged close to each other, and a width of a commonly connected portion is equal to a width of portions other than the commonly connected portion.

(7)

A liquid crystal display device according to the present invention includes, for example, a first substrate and a second substrate which are arranged to face each other with liquid crystal therebetween, a plurality of gate signal lines and a plurality of drain signal lines which are formed on the first substrate, pixels which are formed as regions which are surrounded by the plurality of gate signal lines and the plurality of drain signal lines, counter electrodes formed on the pixels, an insulation film formed above the counter electrodes, and pixel electrodes formed above the insulation film, wherein the pixel electrode includes a first pixel electrode and a second pixel electrode which are overlapped to the counter electrode in plane, the first pixel electrode and the second pixel electrode are electrically connected with the same drain signal line through separate switching elements, the first pixel electrodes and the second pixel electrodes respectively include a plurality of electrodes, and the electrodes which belong to the first pixel electrode and the electrodes which belong to the second pixel electrode are alternately arranged.

(8)

A liquid crystal display device according to the present invention is, for example, on the premise of the constitution (7), characterized in that the separate switching elements are controlled by the same gate signal line.

(9)

A liquid crystal display device according to the present invention is, for example, on the premise of the constitution (7), characterized in that the first pixel electrode has a comb-teeth-shaped pattern in which a conductive body to which the plurality of electrodes are commonly connected is arranged close to one drain signal line of the pixel, and the second pixel electrode has a comb-teeth-shaped pattern in which a conductive body to which the plurality of electrodes are commonly connected is arranged close to another drain signal line of the pixel.

(10)

A liquid crystal display device according to the present invention is, for example, on the premise of the constitution (7), characterized in that the counter electrode of each pixel is electrically connected with the counter electrode of another pixel which is arranged close to each pixel with a gate signal line arranged therebetween through a conducive layer which is formed on an insulation film which is formed in a state that the insulation film also covers the gate signal line.

(11)

A liquid crystal display device according to the present invention includes, for example, on the premise of the constitution (7) two neighboring thin film transistors in each pixel, wherein semiconductor layers of the respective thin film transistors are formed in common, on upper surfaces of the semiconductor layers, respective drain electrodes of the respective thin film transistors are formed in a strip shape, are curved and are formed in an semicircular shape having a center thereof on distal ends of source electrodes which constitute pairs with the drain electrodes, and the drain electrode of one thin film transistor is physically commonly connected with the drain electrode of another thin film transistor at a position where the drain electrodes are arranged close to each other.

Here, the present invention is not limited to the above-mentioned constitutions and various modifications are conceivable without departing from the technical concept of the present invention.

According to the liquid crystal display device having such constitutions, even when short-circuiting with the counter electrode arises in one of pixel electrodes which are connected to respective thin film transistors, the pixel electrode is converted to the counter electrode which contributes to the display in the pixel.

This is because that the respective electrodes which constitute one pixel electrode and the respective electrodes which constitute another pixel electrode are alternately (in a nest-shape) arranged and the respective electrodes of the converted pixel electrode generate an electric field between the respective electrodes of the converted pixel electrode and the respective electrodes of another pixel electrode which is arranged close to the electrodes of the converted pixel electrode.

In this case, when the display is performed only based on the electric field, although the brightness is halved before and after the short-circuiting, there is no change before and after the short-circuiting with respect to a phenomenon that the original counter electrode which is arrange below the insulation film also contribute to the display.

This is because that, with respect to the respective electrodes of another pixel electrode, the electric field (edge electric field) is generated between the respective electrodes of another electrode and the counter electrode mainly in the peripheries of the respective electrodes and this electric field also sufficiently contributes to the display.

Accordingly, even when the short-circuiting arises between the pixel electrode and the counter electrode, it is possible to drive the liquid crystal display device without halving the brightness in the pixel.

DETAILED DESCRIPTION OF THE INVENTION

Hereinafter, an embodiment of a liquid crystal display device according to the present invention is explained in conjunction with drawings.

Figure 8:
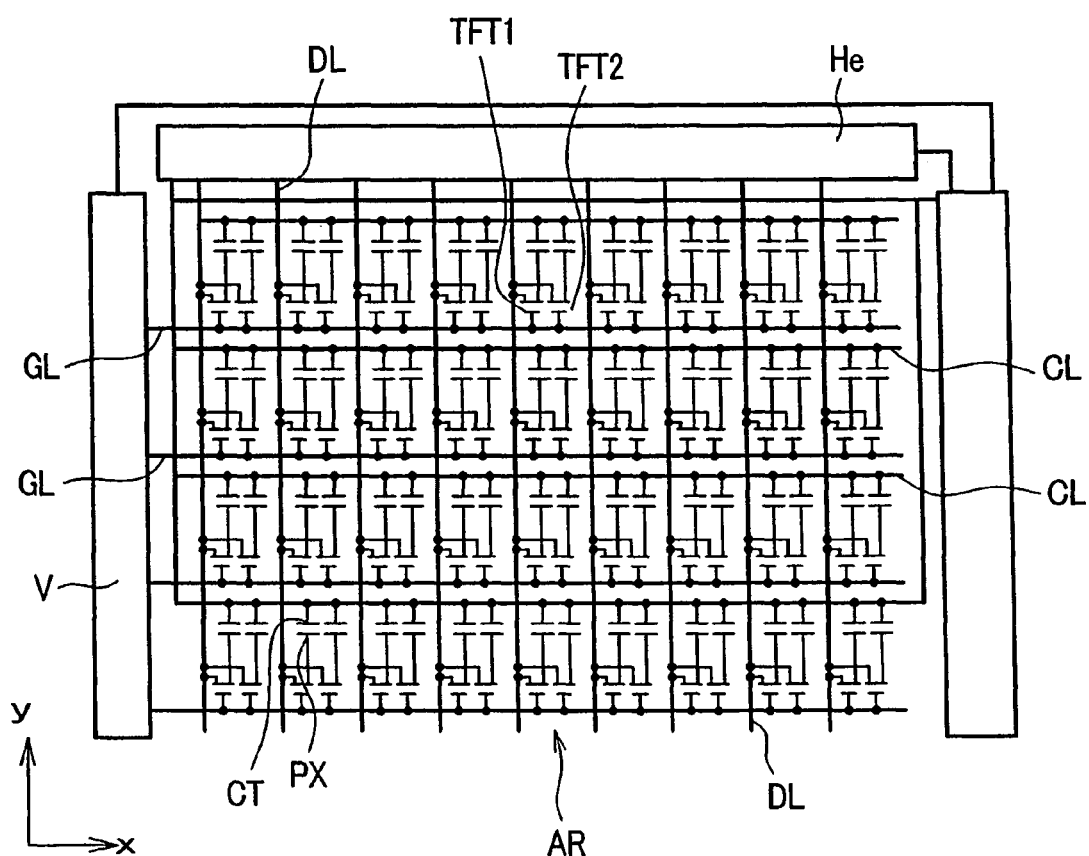
FIG. 8 is a view showing an equivalent circuit of one embodiment of a display part of the liquid crystal display device according to the present invention.

FIG. 8 is an equivalent circuit diagram showing one embodiment of the liquid crystal display device according to the present invention. The equivalent circuit shown in FIG. 8 is an equivalent circuit which is formed on a liquid-crystal-side surface of one substrate out of respective substrates which are arranged to face each other with liquid crystal therebetween.

First of all, on the above-mentioned substrate surface, gate signal lines GL which extend in the x direction and are arranged in parallel in the y direction are formed and, at the same time, drain signal lines DL which extend in the y direction and are arranged in parallel in the x direction are formed. A portion surrounded by the gate signal lines GL and the drain signal lines DL forms a pixel region where a pixel is formed, and a liquid crystal display part AR is constituted of a mass of the pixel regions.

In the inside of a group of pixel regions which is constituted of respective pixel regions which are arranged in parallel in the x direction in the drawing, a reference signal line CL which extends in the x direction is formed, and the reference signal line CL is connected with reference signal lines CL which are formed in the inside of other groups of pixel regions corresponding to these reference signal lines outside the liquid crystal display part AR.

Each pixel region includes two thin film transistors TFT1, TFT2 which are turned on in response to a signal (scanning signal) from the gate signal line GL. When one thin film transistor TFT1 is turned on, a signal from one drain signal line DL (left side in the drawing) out of a pair of drain signal lines DL which sandwich the pixel region is supplied to a pixel electrode PX1. In the same manner, when another thin film transistor TFT2 is turned on, a signal from the above-mentioned drain signal line DL is supplied to a pixel electrode PX2.

Here, the pixel electrode PX1 and the pixel electrode PX2 are respectively independently formed and these pixel electrodes generate electric fields between these electrodes and a common counter electrode CT which is connected to the above-mentioned reference signal line CL. The above-mentioned constitution in which each pixel region includes two thin film transistors TFT1, TFT2 and two pixel electrodes PX1, PX2 which are respectively connected to these respective thin film transistors TFT1, TFT2 is provided for preventing a phenomenon that when short-circuiting arises between one of the pixel electrodes PX1, PX2 and the counter electrode CT in the inside of the pixel, damages which reach a so-called point defect arises. This provision is explained in detail later.

Here, the above-mentioned gate signal lines GL have one ends thereof connected to a scanning signal drive circuit V and a scanning signal is sequentially scanned and supplied to respective gate signal lines GL by the scanning signal drive circuit V. Further, the above-mentioned drain signal lines DL have one ends thereof connected to a video signal drive circuit He and a video signal is supplied to the respective drain signal lines DL by the video signal drive circuit He.

That is, a group of pixels (line) which is constituted of the respective pixels arranged in parallel in the x direction in the drawing is driven such that group of pixels is sequentially selected by the scanning signal, and the video signal is supplied to the respective pixels of the line in conformity with the selection timing.

Figure 1:
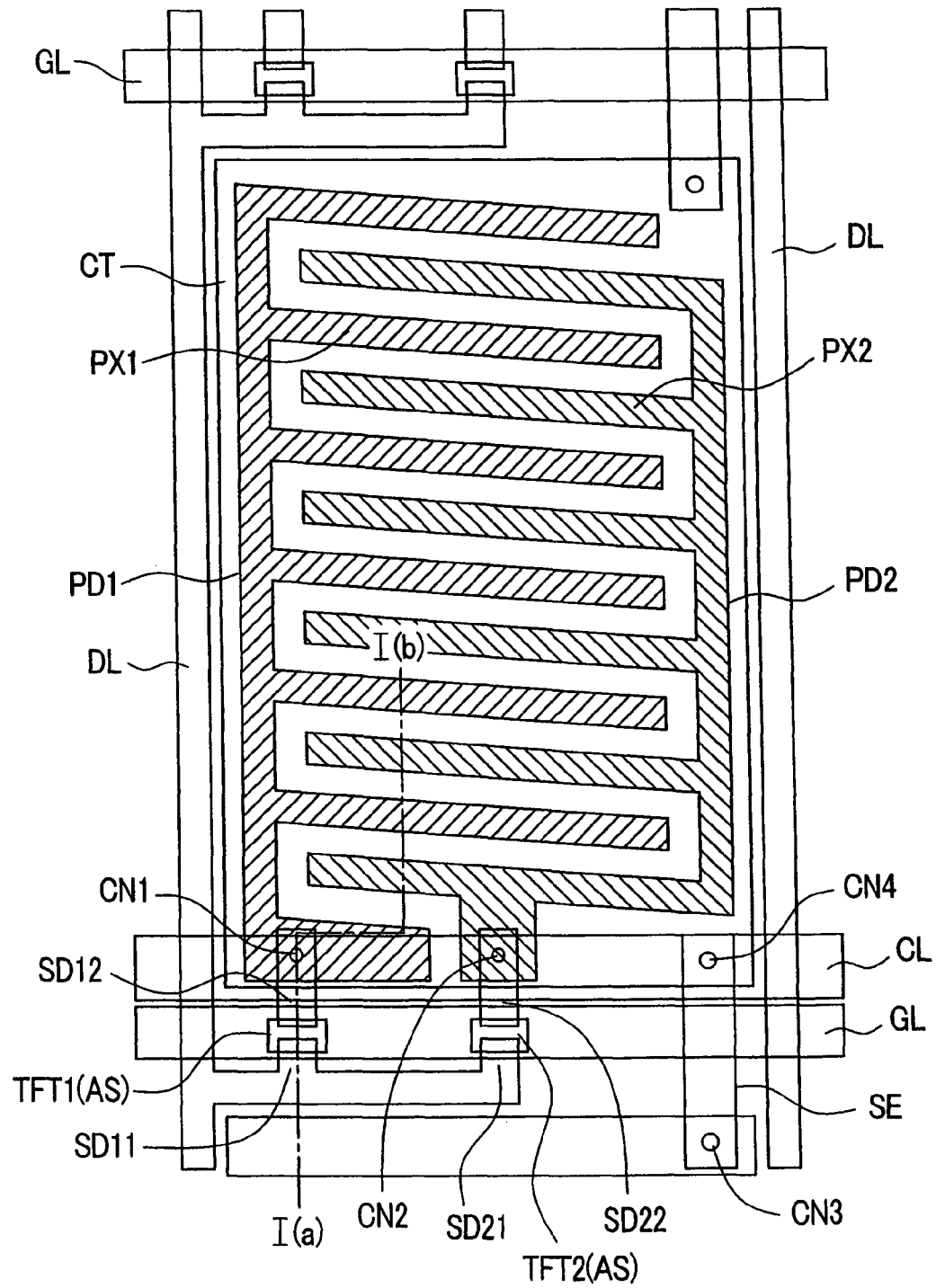
FIG. 1 is a plan view showing one embodiment of the constitution of a pixel of a liquid crystal display device according to the present invention.
Figure 2:
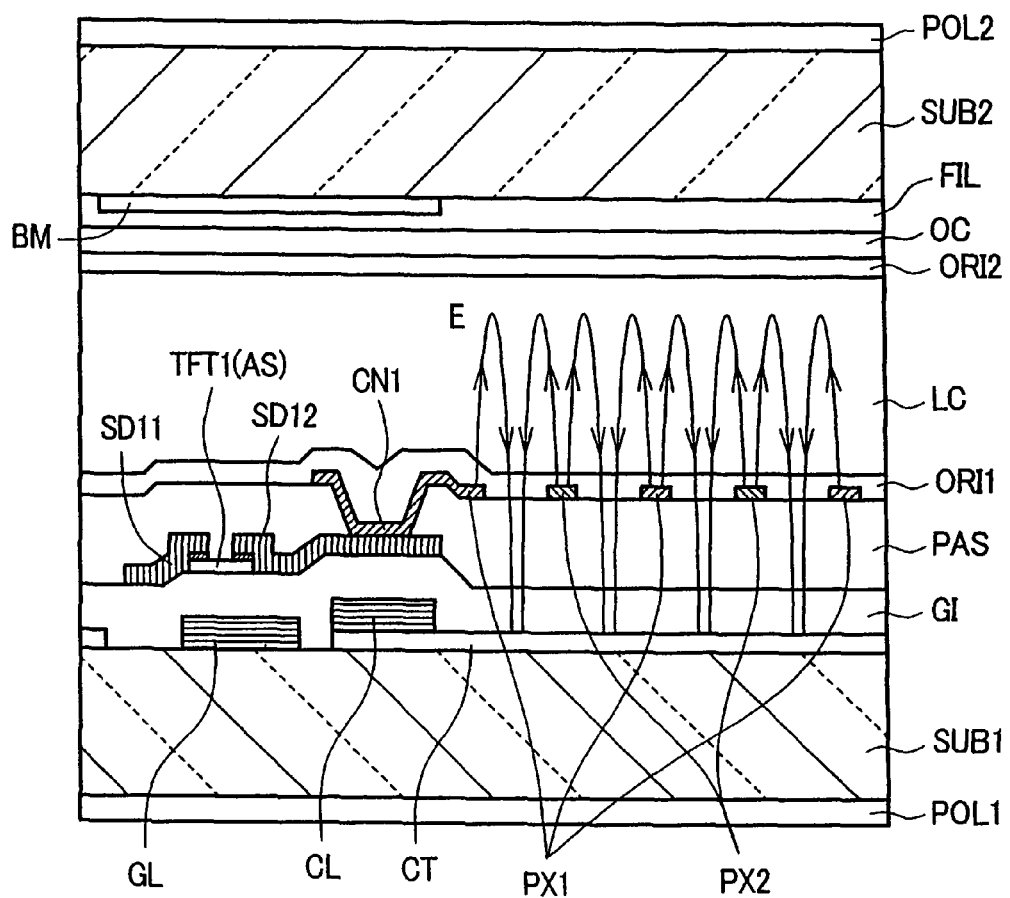
FIG. 2 is a cross-sectional view taken along a line I(a)-I(b) in FIG. 1.

FIG. 1 is a plan view of the specific constitution which shows the above-mentioned constitution in the pixel. Further, FIG. 2 shows a cross section taken along a line I(a)-I(b) in FIG. 1.

On a main surface of the substrate SUB1, the counter electrode CT is formed using a light transmitting material such as ITO (Indium Tin Oxide), for example.

The pixel region is constituted of a region surrounded by gate signal lines GL and the drain signal lines DL described later, while the counter electrode CT is formed over the whole area of a center portion except for a slight periphery of the region.

Further, the gate signal lines GL and the reference signal lines CL are formed. These gate signal lines GL and reference signal lines CL are, for example, formed in the same step and hence, the gate signal lines GL and the reference signal lines CL are constituted of a same material.

Here, the reference signal line CL is formed close to and adjacent to one gate signal line GL out of the respective gate signal lines GL which surround the pixel region and, at the same time, the reference signal line CL is directly overlapped to the counter electrode CT whereby the reference signal line CL is electrically connected with the counter electrode CT.

Further, over a whole area of the main surface of the substrate SUB1, an insulation film GI is formed in a state that the insulation film GI covers the above-mentioned gate signal lines GL and the like. The insulation film GI functions as the gate insulation film for the thin film transistor TFT described later and, at the same time, functions as an interlayer insulation film.

On a portion of a region of an upper surface of the insulation film GI which is overlapped to the above-mentioned gate signal line GL, a semiconductor layer AS is formed. The semiconductor layer AS is formed of a first semiconductor layer AS1 and a second semiconductor layer AS2. This constitution is provided for forming the first thin film transistor TFT1 and the second thin film transistor TFT2 on portions where the respective semiconductor layers are formed.

In this case, the respective semiconductor layers AS1, AS2 are arranged to approach the left side of the pixel region, that is, the drain signal line DL side for introducing the video signal to the pixel.

By forming a pair of opposing electrodes (source and drain electrodes) on an upper surface of each semiconductor layer AS1, AS2, a transistor having the inverse staggered MIS structure which adopts the above-mentioned gate signal line GL as a gate electrode is formed, wherein the electrodes are simultaneously formed with the formation of the drain signal line DL.

That is, a part of the drain signal line DL which is positioned on the left side of the pixel region includes a portion which extends in parallel to the gate signal line GL, and the extending portion is bent and bent portions get over the semiconductor layers AS1, AS2 from one side thereof which are respectively arranged close to the extending portion thus forming drain electrodes SD11, SD21. Further, on a surface of each semiconductor layer AS1, AS2, source electrodes SD12, SD22 are formed in a spaced-apart manner from the respective drain electrodes SD11, SD21 by a channel length. Here, the source electrodes SD12, SD22 are formed in a state that the source electrodes SD12, SD22 include extending portions which are slightly extended toward the pixel region side from the surfaces of the respective semiconductor layers AS1, AS2. These extending portions are provided to form portions which establish the connection with the pixel electrodes PX1, PX2 described later.

Further, over a whole area of the surface of the substrate SUB1, a protective film PAS is formed in a state that the protective film PAS also covers the above-mentioned drain signal lines DL. The protective film PAS has a function of obviating the direct contact of the above-mentioned thin film transistors TFT1, TFT2 with liquid crystal LC described later, wherein a material of the protective film PAS is an inorganic material, an organic material, a stacked body of an inorganic material and an organic material or the like.

The pixel electrodes PX is formed on a surface of the protective film PAS. The pixel electrode PX is formed in the inside of a region where the counter electrode CT is formed. Due to such a constitution, the pixel electrode PX is overlapped to the counter electrode CT in a state that the insulation film GI and the protective film PAS are interposed therebetween.

The pixel electrode PX is constituted of a first pixel electrode PX1 and a second pixel electrode PX2. The first pixel electrode PX1 has a portion thereof electrically connected with the extending portion of the source electrode SD12 of the above-mentioned thin film transistor TFT1 through a contact hole CN1 which is preliminarily formed in the above-mentioned protective film PAS below the first pixel electrode PX1. In the same manner, the second pixel electrode PX2 has a portion thereof electrically connected with the extending portion of the source electrode SD12 of the above-mentioned thin film transistor TFT2 through a contact hole CN2 which is preliminarily formed in the above-mentioned protective film PAS below the second pixel electrode PX2.

The first pixel electrode PX1 and the second pixel electrode PX2 are, respectively, constituted of a group of electrodes formed of a plurality of electrodes which are extended substantially in the x direction and are arranged in parallel in the y direction, wherein the electrodes of the first pixel electrode PX1 and the electrodes of the second pixel electrode PX2 are respectively alternately arranged.

Further, in the first pixel electrode PX1, the respective electrodes are integrally formed with a conductive layer PD1 which is formed close to and in parallel to the drain signal line DL which supplies the video signal to the pixel thus forming a comb-teeth-shaped pattern. Also in the second pixel electrode PX2, the respective electrodes are integrally formed with a conductive layer PD2 which is formed close to and in parallel to the drain signal line DL which is different from the above-mentioned drain signal line DL and sandwiches the pixel therebetween thus forming a comb-teeth-shaped pattern.

Further, a conductive member SE which is formed simultaneously at the manufacture of the pixel electrode PX is formed in a state that the conductive member SE traverses a portion of the gate signal line GL. The conductive member SE is formed at a position close to another drain signal line DL different from the drain signal line DL which supplies the video signal to the pixel through the thin film transistor TFT. By selecting the position which is relatively spaced-apart from the thin film transistor TFT, it is possible to sufficiently avoid the contact of the conductive member SE with the thin film transistor TFT.

One end of the conductive member SE in the pixel region is electrically connected with the reference electrode CL through a contact hole CN4 which penetrates the protective film PAS and the insulation film GI below the conductive member SE, while another end of the conductive member SE in another neighboring pixel region is electrically connected with the counter electrode CT in another pixel region through a contact hole CN3 which penetrates the protective film PAS and the insulation film GI below the conductive member SE.

In the display part, with respect to the respective counter electrodes CT which are physically separated from each other and are scattered for respective pixels, the counter electrode CT of each pixel is connected with the counter electrode CT of other neighboring pixel in the x direction using the reference signal line DL and is connected with the counter electrode CT of other neighboring pixel in the y direction using the above-mentioned conductive member SE and hence, it is possible to obtain an advantageous effect that the supply of the reference signal can be performed without giving rise to a distortion of waveforms in each pixel.

An orientation film ORI1 is formed over the whole area of the surface of the substrate SUB1 in a state that the orientation film ORI1 also covers the pixel electrodes PX and the like. The orientation film ORI1 has a function of initially orienting molecules of the liquid crystal LC which is brought into contact with the orientation film ORI1.

Here, on a liquid-crystal LC-side surface of another substrate SUB2 which is arranged over one substrate SUB1 by way of liquid crystal LC, a black matrix BM which is formed to define the pixel from the neighboring other pixels, a color filter FIL which is formed to allow the pixel to be allocated to one color out of three primary colors for color display, a leveling film OC which is formed for leveling a surface of the color filter FIL, and an orientation film ORI2 which is formed for initially orienting the molecules of the liquid crystal LC are formed.

Through the thin film transistors TFT1, TFT2 which are simultaneously turned on in response to the supply of the scanning signal from the gate signal line GL, the video signal from the drain signal line DL is supplied to the pixel electrodes PX1, PX2 respectively. On the other hand, a signal which becomes the reference with respect to the video signal is supplied to the counter electrode CT through the reference signal line CL.

Accordingly, as shown in FIG. 2, electric fields (lines of electric forces) E are generated between the pixel electrode PX (PX1, PX2) and the counter electrode CT thus activating the behavior of the molecules of the liquid crystal LC.

In this case, the electric fields E are generated substantially vertically with respect to the counter electrode CT at a periphery (edge portion) of the counter electrode CT, and are generated substantially parallel to the substrate SUB1 over the whole electrode CT and both electric fields E contribute to the behavior of molecules of the liquid crystal LC.

Figure 3:
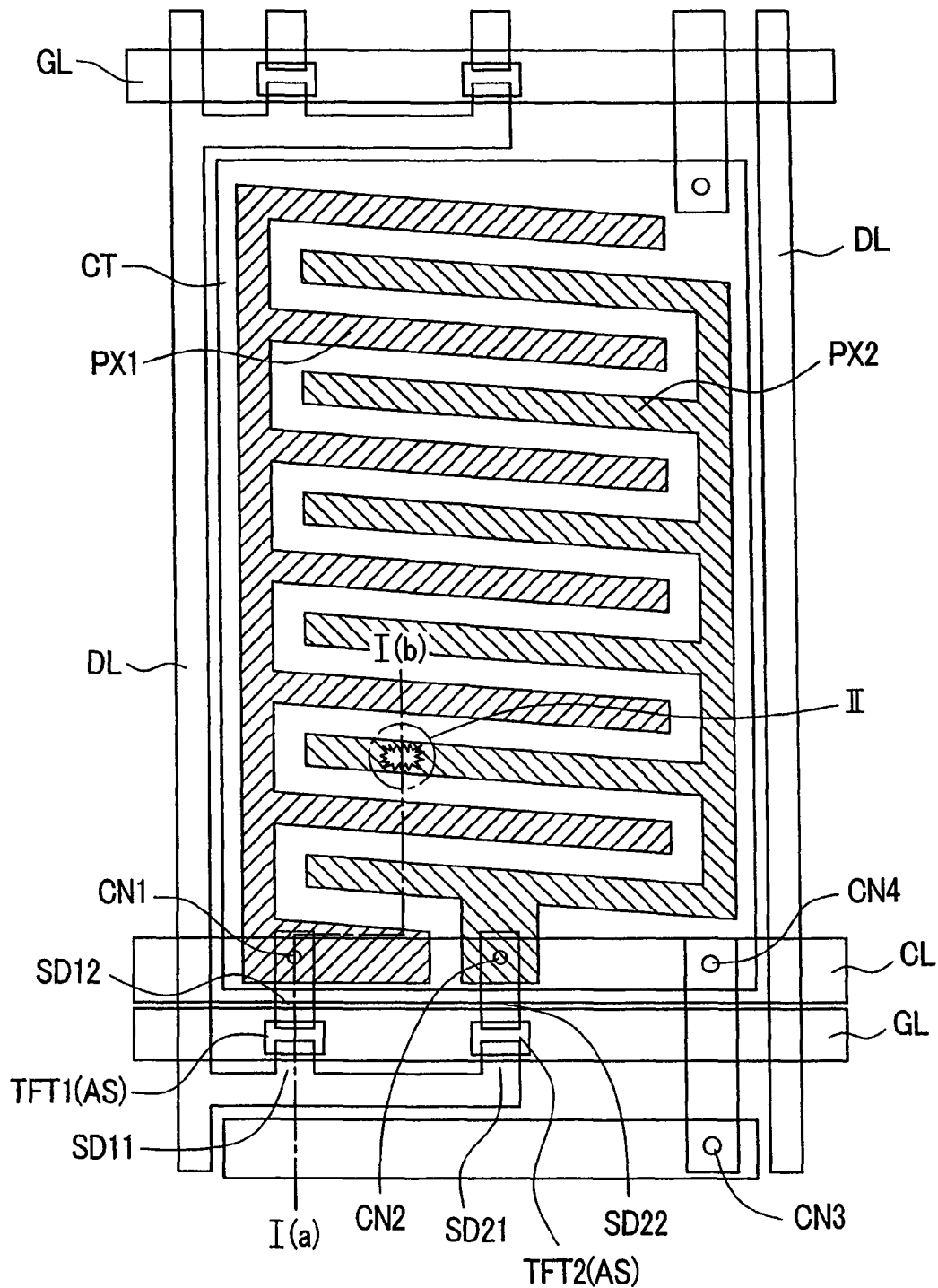
FIG. 3 is an explanatory view showing an advantageous effect of the liquid crystal display device according to the present invention.

FIG. 3 is an explanatory view showing an advantageous effect of the liquid crystal display device having the above-mentioned constitution and corresponds to FIG. 1.

Assume that, as shown in FIG. 3, a portion of the pixel electrode PX (the portion indicating the pixel electrode PX2 in the drawing) is short-circuited with the counter electrode CT through a pin hole which is undesirably formed in the protective film PAS and the insulation film GI below the pixel electrode PX2. The formation of the pin hole in the protective film PAS and the insulation film GI is a phenomenon which often occurs due to the presence of a foreign substance, for example, during the manufacture of the liquid crystal display device.

Figure 4:
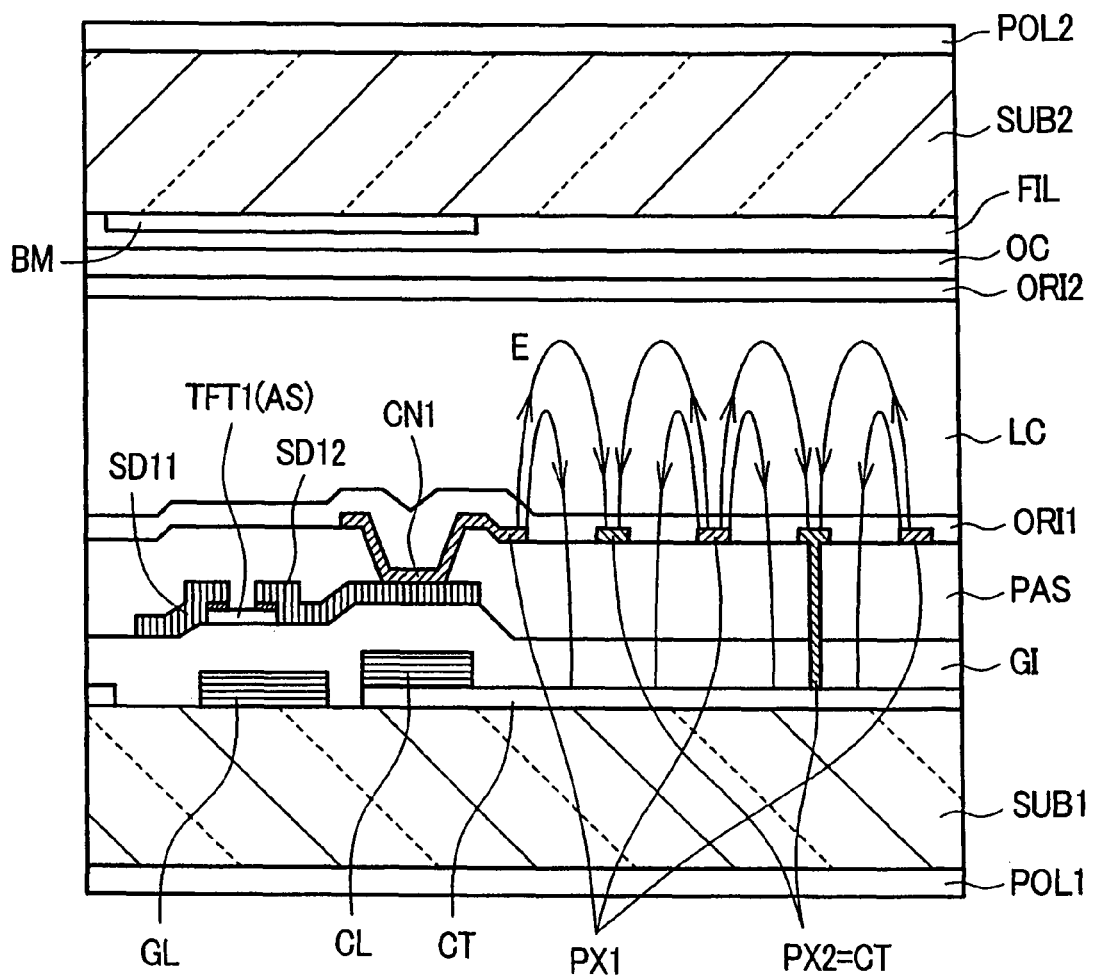
FIG. 4 is a cross-sectional view taken along a line I(a)-I(b) in FIG. 3.

Here, the short-circuiting between the pixel electrode PX2 and the counter electrode CT due to the above-mentioned pin hole is shown in FIG. 4 which is a cross-sectional view taken along a line I(a)-I(b) in FIG. 3.

When such short-circuiting arises, the pixel electrode PX2 has the same potential, as the counter electrode CT and hence, a function of the pixel electrode PX2 is damaged. However, the pixel electrode PX2 is converted to the counter electrode and possesses a function of the counter electrode and hence, an electric field is generated between the converted counter electrode and the pixel electrode PX1 which is arranged close to the converted counter electrode and the electric field contributes to the display.

Further, the function of the pixel electrode PX1 after short-circuiting is equal to the function of the pixel electrode PX1 before the short-circuiting and still generates the electric fields between the pixel electrode PX1 and the original counter electrode CT which is arranged below the protective film PAS and the insulation film GI thus contributing to the display.

Due to such a constitution, even when the short-circuiting arises between the pixel electrode and the counter electrode, it is possible to drive the liquid crystal display device without decreasing the brightness of the pixel to one half of the original brightness.

Figure 5:
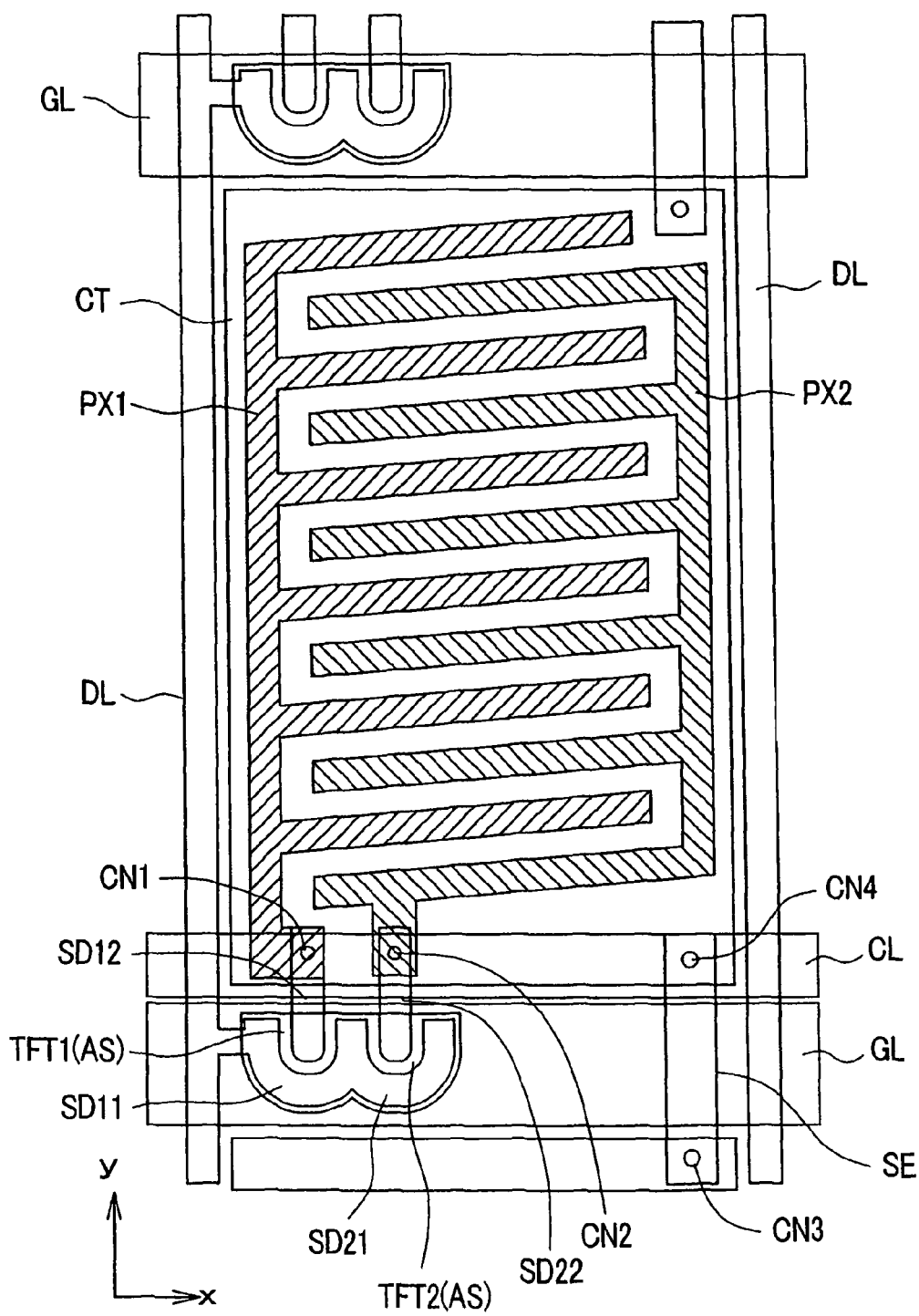
FIG. 5 is a plan view showing one embodiment of the constitution of the pixel of the liquid crystal display device according to the present invention.

FIG. 5 is a plan view of another embodiment of the pixel of the liquid crystal display device according to the present invention and corresponds to FIG. 1.

The constitution which makes this embodiment different from the embodiment shown in FIG. 1 lies in, first of all, the thin film transistors TFT1 and TFT2.

Respective drain electrodes SD11, SD21 of thin film transistors TFT1, TFT2 which are arranged close to a gate signal line GL are formed in a pattern in which the drain electrodes SD11, SD21 surround distal ends of source electrodes SD12, SD22 of the thin film transistors TFT1, TFT2.

Here, the distal ends of the source electrodes SD12, SD22 are end portions thereof on a side opposite to a side which is connected with corresponding pixel electrodes PX1, PX2 and are portions which substantially function as the source electrodes SD12, SD22 of the thin film transistors TFT1, TFT2.

That is, the drain electrode SD11 is formed in a strip shape and is curved to form a semicircular shape having a center thereof at the above-mentioned distal end portion of the source electrode SD12 which constitutes a pair of electrodes with the drain electrode SD11. In the same manner, the drain electrode SD21 is also formed in a strip shape and is curved to form a semicircular shape having a center thereof at the above-mentioned distal end portion of the source electrode SD22 which constitutes a pair of electrodes with the drain electrode SD21.

Further, these drain electrode SD11 and drain electrode SD21 have neighboring portions thereof physically connected with each other, wherein a width of the connecting portion is set equal to a width of these electrodes other than the connecting portion. Accordingly, the drain electrode SD11 and the drain electrode SD21 are formed in a substantially "W"-shaped pattern in which the drain electrode SD11 and the drain electrode SD21 respectively have smooth arcuate portions.

The formation of the drain electrode SD11 and the drain electrode SD21 in a state that the drain electrodes SD11, SD21 surround the source electrodes SD12, SD22 which constitute pairs with the drain electrodes SD11, SD21 is provided for increasing channel widths of the respective thin film transistors TFT1, TFT2. To set channel lengths uniform along the channel width direction, the distal end portions of the source electrodes SD12, SD22 are formed in an arcuate shape where corners are rounded. Such formation of the distal end portions of the source electrodes SD12, SD22 is provided for aligning the curvature of distal end portions of the source electrodes SD12, SD22 with the curvature of inner periphery (a peripheral surface which faces the source electrodes SD12, SD22) of the drain electrode SD11 and the drain electrode SD21.

Due to such a constitution, it is possible to ensure large channel widths of both thin film transistors TFT1, TFT2 and, at the same time, it is possible to arrange these thin film transistors TFT1, TFT2 as close as possible. This is because that, as described above, the width of the connecting portion between the drain electrode SD11 and the drain electrode SD21 is set equal to the widths of the drain electrode SD11 and the drain electrode SD21 other than the connecting portion.

In the case of this embodiment, as described above, the conductive member SE which is provided for connecting the counter electrodes CT of the neighboring respective pixels with the gate signal line GL therebetween is arranged and hence, it is possible to ensure the sufficient distance between the above-mentioned thin film transistors TFT1, TFT2 thus giving rise to an advantageous effect that the short-circuiting between the thin film transistors TFT1, TFT2 can be sufficiently avoided.

Here, although the semiconductor layers AS of the thin film transistors TFT1, TFT2 may be formed in common and a shape of the semiconductor layers AS may be a rectangular shape, in FIG. 5, the semiconductor layer AS is configured such that other sides except for one side of the rectangular shape thereof conform to outer periphery of the drain electrode SD11, SD21.

Further, the pixel electrode PX1 which is connected to the source electrode SD12 of the thin film transistor TFT1 is configured to avoid a state that a connecting portion thereof faces the pixel electrode PX2 which is arranged close to the connecting portion in the y direction. This constitution differs from the constitution of the case shown in FIG. 1 at the same position. That is, this constitution is resulted from the arrangement in which the respective thin film transistors TFT1, TFT2 can be arranged close to each other.

Here, the pixel electrode PX2 which is arranged close to the connecting portion in the y direction is configured to project toward the thin film transistors TFT1 side than the branched portion necessary for the connection with the source electrode SD22 in the longitudinal direction. This constitution is adopted to enlarge the region which functions as the pixel.

Figure 6:
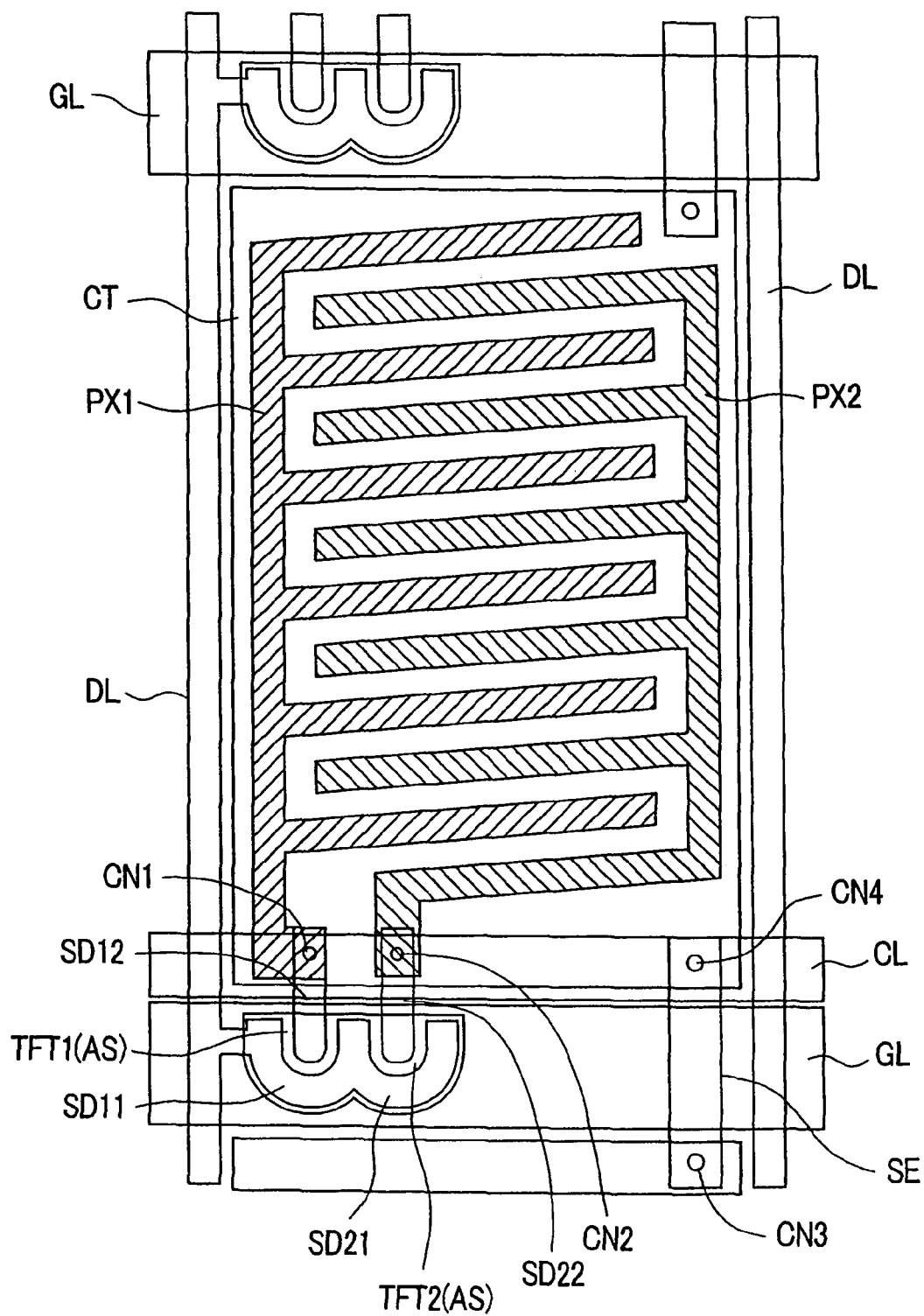
FIG. 6 is a plan view showing one embodiment of the constitution of the pixel of the liquid crystal display device according to the present invention.

Accordingly, as shown in FIG. 6 which shows another embodiment corresponding to FIG. 5, it is needless to say that the formation of the projecting portion is not always necessary.

Figure 7:
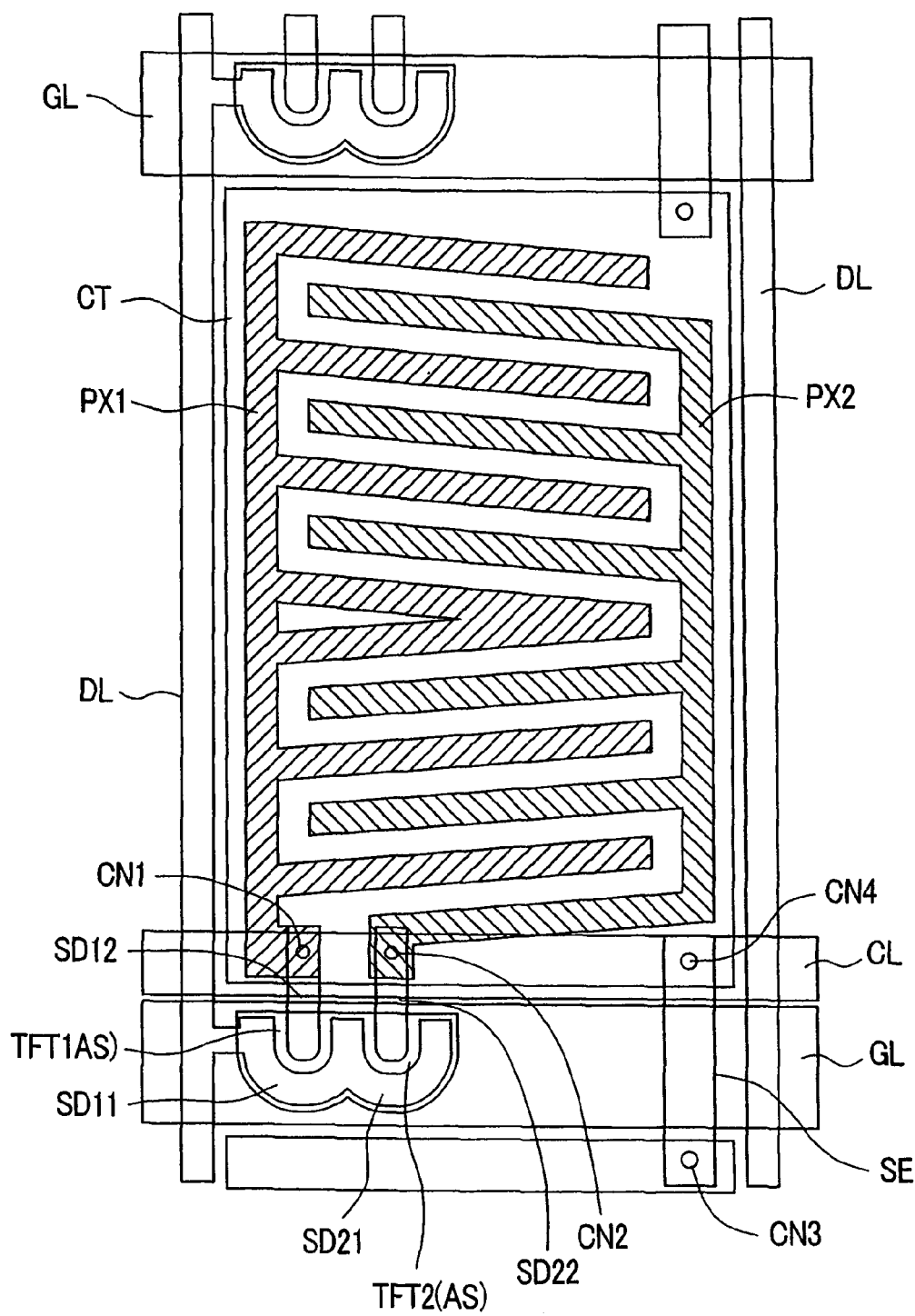
FIG. 7 is a plan view showing one embodiment of the constitution of the pixel of the liquid crystal display device according to the present invention.

FIG. 7 is a view showing another modification of the pattern of the pixel electrode PX1, PX2. Using an imaginary line segment which runs in the x direction in the drawing at the center of the pixel region, the pattern of the pixel electrode PX1, PX2 on the side where the thin film transistors TFT1, TFT2 are formed is substantially equal to the pattern shown in FIG. 6, fore example. On the other hand, with respect to this pattern, the upper-side pattern in the drawing has the line symmetry relationship using the above-mentioned imaginary line segment.

Due to such a constitution, it is possible to make an angle of running direction of the electrodes of the respective pixel electrodes PX1, PX2 different from each other between the upper side and the lower side in the drawing thus capable of adopting the so-called multi-domain structure.

The above-mentioned respective embodiments may be used in an independent manner from each other or in combination. This is because that the respective advantageous effects may be obtained singly or synergistically.

What is claimed is:

1. A liquid crystal display device, comprising:
    a plurality of drain signal lines, a plurality of gate signal lines, and a plurality of reference signal lines, the drain signal lines, the gate signal lines, and the reference signal lines being formed on a surface of a substrate that faces liquid crystal;
    a plurality of pixel regions defined by the drain signal lines and the gate signal lines; and
    corresponding first and second pixel electrodes and a corresponding counter electrode in each pixel region,
    wherein, in each pixel region:
    a contact bridge line is arranged in the pixel region to cross one of the gate signal lines that defines the pixel region, the contact bridge line being connected to a reference signal line corresponding to the pixel region and the corresponding counter electrode in another pixel region that is adjacent to the pixel region,
    the corresponding counter electrode in the pixel region is formed between the substrate and an insulation film, and the pixel electrodes are formed between the liquid crystal and the insulation film,
    the first and second pixel electrodes are constituted of separate pixel electrodes to which a video signal which is supplied to the pixel region is inputted through two thin film transistors at the same timing,
    each of the separate first and second pixel electrodes is formed of a respective plurality of electrodes such that the electrodes of the first pixel electrode are alternately arranged with the electrodes of the second pixel electrode,
    the corresponding counter electrode in the pixel region is formed in a plane shape, is connected to the reference signal line corresponding to the pixel region, and overlaps the first and second pixel electrodes;
    the two thin film transistors have respective semiconductor layers, respective drain electrodes, and respective source electrodes,
    the respective source electrodes are connected to the separate first and second pixel electrodes through respective contact holes that are arranged on the reference signal line corresponding to the pixel region,
    the semiconductor layers are formed on one of the gate signal lines defining the pixel region and do not protrude from the gate signal line,
    the respective drain electrodes of the two thin film transistors are electrically connected to a same one of the drain signal lines that defines the pixel region and are each formed in a semicircular shape,
    respective end portions of the respective source electrodes are respectively arranged in respective inner portions of the semicircular shapes of the respective drain electrodes, and
    the respective drain electrode of one of the thin film transistors is physically and commonly connected with the respective drain electrode of the other thin film transistor at a position where the drain electrodes are arranged close to each other, and a width of a commonly connected portion of the respective drain electrodes is equal to a width of portions of the respective drain electrodes other than the commonly connected portion.

* * * * *